United States Patent
Acikgoez et al.

(10) Patent No.: US 10,355,260 B2
(45) Date of Patent: Jul. 16, 2019

(54) ENERGY STORAGE ARRANGEMENT, CONTACTING ELEMENT, AND METHOD FOR PRODUCING AN ENERGY STORAGE ARRANGEMENT

(71) Applicant: AUDI AG, Ingolstadt (DE)

(72) Inventors: Erdal Acikgoez, Reichertshofen (DE); Jörg Schmidt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 139 days.

(21) Appl. No.: 15/525,706

(22) PCT Filed: Nov. 18, 2015

(86) PCT No.: PCT/EP2015/076938
§ 371 (c)(1),
(2) Date: May 10, 2017

(87) PCT Pub. No.: WO2016/079168
PCT Pub. Date: May 26, 2016

(65) Prior Publication Data
US 2018/0331344 A1    Nov. 15, 2018

(30) Foreign Application Priority Data

Nov. 20, 2014   (DE) ........................ 10 2014 017 143

(51) Int. Cl.
*H01M 2/20* (2006.01)
*H01M 2/10* (2006.01)
(Continued)

(52) U.S. Cl.
CPC ............ *H01M 2/206* (2013.01); *H01M 2/10* (2013.01); *H01M 2/305* (2013.01); *H01R 13/512* (2013.01); *H01M 10/0525* (2013.01)

(58) Field of Classification Search
CPC ........................... H01M 2/1077; H01M 2/206
See application file for complete search history.

(56) References Cited

U.S. PATENT DOCUMENTS

| 2012/0224309 A1 | 9/2012 | Ikeda et al. |
| 2013/0236761 A1 | 9/2013 | Seong et al. |
| 2015/0214518 A1* | 7/2015 | Kano ............... H01M 2/1094 429/99 |

FOREIGN PATENT DOCUMENTS

| CN | 202513225 | 10/2012 |
| DE | 8426772 U1 | 11/1984 |

(Continued)

OTHER PUBLICATIONS

Translation of the International Preliminary Report on Patentability dated Jun. 1, 2017, in connection with corresponding international Application No. PCT/EP2015/076938 (8 pgs.).

(Continued)

*Primary Examiner* — Olatunji A Godo
(74) *Attorney, Agent, or Firm* — Maier & Maier, PLLC

(57) ABSTRACT

An energy storage arrangement, having at least two electric energy storage units, each of which includes an energy storage housing with electric energy storage cells arranged therein. The at least two electric energy storage units are electrically contacted by an electrical contacting element. The electrical contacting element includes a contacting part, formed from an electrically conductive material, and a touch protection part, formed from an injection-moldable plastic material. The contacting part is overmolded on portions with the injection-moldable plastic material forming the touch protection part. At least one positioning element for positioning of the contacting element at an energy storage unit is formed at the touch protection part and at least one inserting element for the insertion of a connecting element that connects the contacting element to an energy storage unit is formed at the touch protection part.

14 Claims, 4 Drawing Sheets

(51) Int. Cl.
*H01M 2/30* (2006.01)
*H01R 13/512* (2006.01)
*H01M 10/0525* (2010.01)

(56) References Cited

FOREIGN PATENT DOCUMENTS

| | | |
|---|---|---|
| DE | 3518216 A1 | 11/1986 |
| DE | 4123361 A1 | 1/1993 |
| DE | 69409003 T2 | 10/1998 |
| DE | 102007031860 A1 | 1/2009 |
| DE | 102011087038 A1 | 5/2013 |
| DE | 102012215205 A1 | 3/2014 |
| DE | 102012218500 A1 | 4/2014 |
| WO | WO2014034020 * | 3/2014 |

OTHER PUBLICATIONS

Office Action dated Jul. 17, 2015 issued in corresponding German application No. 10 2014 017 143.4; 5 pgs.
International Search Report dated Jan. 20, 2016 issued in corresponding International application No. PCT/EP2015/076938; 6 pgs.
Chinese Office Action dated Mar. 22, 2019, in connection with corresponding CN Application No. 201580062876.1 (19 pgs., including English translation).

* cited by examiner

ENERGY STORAGE ARRANGEMENT, CONTACTING ELEMENT, AND METHOD FOR PRODUCING AN ENERGY STORAGE ARRANGEMENT

FIELD

The invention relates to an energy storage arrangement, having at least two electric energy storage units, each of which comprises an energy storage housing with electric energy storage cells arranged in it, wherein the at least two electric energy storage units are contacted electrically by means of an electrical contacting element, wherein the electrical contacting element comprises a contacting part formed from an electrically conductive material and a touch protection part formed from an injection-moldable plastic material, wherein, for formation of the touch protection part, the contacting part is overmolded at least on portions thereof with the injection-moldable plastic material forming the touch protection part.

BACKGROUND

Energy storage arrangements of this kind are known. The electric energy storage units forming a respective energy storage arrangement each comprise a plurality of electric energy storage cells arranged in an energy storage housing. The corresponding electric energy storage cells can be lithium-ion cells, for example. The electric energy storage units forming each energy storage arrangement may also be referred to or regarded as electric energy storage modules.

Each electric energy storage unit is electrically contacted by means of electrical contacting elements. It is thereby possible to form corresponding electrical contacting elements in two parts. Electrical contacting elements of this kind comprise a contacting part, formed from an electrically conductive material, and a touch protection part, formed from an injection-moldable plastic material. For formation of the touch protection part, the contacting part can be overmolded at least on portions thereof with the injection-moldable plastic material forming the touch protection part.

Particularly in connection with the production or assembly of corresponding energy storage arrangements, the handling of the respective electric energy storage units and the respective electrical contacting elements, in particular in regard to ensuring a reliable touch protection, is at times difficult and hence is worthy of improvement.

SUMMARY OF THE DISCLOSURE

The invention is based on the object of presenting an energy storage arrangement that is improved in this respect.

The object is achieved by an energy storage arrangement of the kind mentioned in the beginning, characterized in that at least one positioning means is formed at an energy storage unit at the touch protection part for correct positioning of the contacting element and/or at least one inserting means for the insertion of a connecting element that connects the contacting element to an energy storage unit is formed at the touch protection part.

The energy storage arrangement described herein has a plurality of, that is, at least two, electric energy storage units. The electric energy storage units, referred to hereinafter in short as "energy storage units," each comprise an energy storage housing with electric energy storage cells arranged therein. The electric energy storage cells, which are referred to hereinafter in short as "energy storage cells," can be lithium-ion cells, for example. The at least two electric energy storage units are contacted electrically with one another by means of an electrical contacting element.

The electrical contacting element, which will be referred to hereinafter in short as "contacting element," comprises a contacting part and a touch protection part that is undetachably joined to it by overmolding.

The contacting part serves for the actual electrical contacting of the contacting element with an energy storage unit, that is, typically with an electrical terminal junction element on the energy storage unit side or on the energy storage housing side. The contacting part is accordingly formed from an electrically conductive material, typically a metal. An appropr*iate metal can be, for example, aluminum or copper or corresponding alloys.

The touch protection part serves for the creation of an (electrical) touch protection, which prevents any transmission of electric energy from a respective energy storage unit to an operator, such as, for example, a worker, or to an object, such as, for example, a terminal junction component or a robot, via the contacting element. Accordingly, no "outward" electric energy is applied to the contacting element, that is, in particular no electric voltage. The touch protection part is accordingly formed from an electrically non-conductive or very poorly conductive material, namely an injection-moldable material, that is, a plastic material that can be processed in a plastic injection-molding process. An appropriate plastic material can be, for example, an injection-moldable thermoplastic plastic, such as, for example, PA, PC, PE, PP, PBT, etc., or a blend of chemically differing plastics.

For formation of the touch protection part, the contacting part is overmolded at least on portions thereof with the injection-moldable plastic material forming the touch protection part. The touch protection part and hence the entire contacting element are thus produced through overmolding of the contacting part at least on portions thereof with the injection-moldable plastic material forming the touch protection part in the scope of a plastic injection-molding process, that is, in particular in the scope of a so-called insert molding process. In the process, the contacting part, apart from the contacting regions on the contacting part side for contacting of the contacting element with respective electrical terminal junction elements on the energy storage unit side or on the energy storage housing side, is typically overmolded completely with the plastic material forming the touch protection part.

It is essential for the principle described herein that, in the scope of the overmolding of the contacting part or in the scope of creation of the touch protection part, functional elements that are appropriate to the production and assembly of corresponding energy storage arrangements are formed at the touch protection part both in regard to the handling of the respective electric energy storage unit and of the respective electrical contacting elements and also in regard to ensuring a reliable touch protection. Accordingly, appropriate functional elements are typically molded in one piece or integrally with the touch protection part or in one piece or integrally at the touch protection part.

The functional element formed accordingly at the touch protection part can be a positioning means or a positioning aid for the correct positioning of the contacting element at the energy storage unit or at an energy storage housing. The correct positioning of the contacting element at an energy storage unit or at an energy storage housing is simplified by an appropriate positioning means.

Alternatively or additionally, an appropriate functional element formed at the touch protection part can be an inserting means for the insertion of a connecting element that connects the contacting element to an energy storage unit or to an energy storage housing. The insertion of a corresponding connecting element that connects the contacting element to an energy storage unit or to an energy storage housing is simplified by an appropriate inserting means.

An appropriate connecting element is typically a connecting screw that is formed from an electrically conductive material, typically a metal, and can be screwed into a screw-connection region formed at an electrical terminal junction element on the energy storage unit side or on the energy storage housing side or is screwed in place in a properly mounted state of the energy storage arrangement. An appropriate connecting screw can be provided at least on portions thereof with an outer thread and a corresponding screw-connection region can be provided at least on portions thereof with an inner thread corresponding to the outer thread of the connecting screw.

In terms of geometrical design, an appropriate contacting part of a contacting element can have two base portions, each of which has a contacting region for electrical contacting with an electrical terminal junction element on the energy storage unit side, and one connecting portion, which connects the two base portions. Accordingly, the base portions serve functionally, via respective contacting regions, to produce an electrical contacting of the contacting element with an energy storage unit, that is, in particular with an electrical terminal junction element on the energy storage unit side or on the energy storage housing side. The base portions are typically provided with at least one borehole, through which at least one corresponding connecting element can be inserted or is inserted in the properly mounted state of the energy storage arrangement.

An appropriate connecting portion can have first connecting portion segments projecting from a respective base portion in an angled, in particular perpendicular, manner and a second connecting portion segment that connects each of the first connecting portion segments. Accordingly, the overall angled geometric design of the contacting part can be created by stamping/bending processes; the contacting part can accordingly be a stamped/bent part that is relatively simple to create in terms of production engineering.

The geometric design of the touch protection part follows typically (at least in essence) the geometric design of the contacting part. Correspondingly, the touch protection part can likewise have two base portions and a connecting portion that connects the two base portions. The connecting portion can, furthermore, likewise have first connecting portion segments projecting from a respective base portion in an angled, in particular perpendicular, manner and a second connecting portion segment that connects each of the first connecting portion segments.

To return to the positioning means formed at the contacting element, the positioning means, or a positioning means in general, can be formed by an uptake or seat that projects from the or a respective base portion of the contacting element in an angled, in particular perpendicular, manner for seating a positioning element that projects from the energy storage housing and is, in particular, dome-shaped, pin-like, or peg-like, or at least comprises such a positioning element. Alternatively or additionally, the positioning means or a positioning means in general can be formed by a positioning element that projects from the or a respective base portion of the contacting element in an angled, in particular perpendicular, manner, and is, in particular dome-shaped, pin-like, or peg-like, for seating in a seat formed at the energy storage housing, or at least comprises such a positioning element. A respective base portion of the contacting element corresponds typically to a respective base portion of the touch protection part.

To return to the inserting means formed at the contacting element, the inserting means or an inserting means in general can be formed by an inserting portion that projects from the or a base portion of the contacting element in an angled, in particular perpendicular, manner and has the shape of a sleeve or tube or, in general, a hollow cylinder. The inner diameter of a corresponding sleeve-like inserting portion is adapted to the maximum outer diameter of a respective connecting element so that it can be introduced into the inserting portion in a straightforward manner. A respective base portion of the contacting element also corresponds typically here to a corresponding base portion of the touch protection part. A corresponding sleeve-like inserting portion is introduced, as viewed axially, into a borehole present in a base portion on the contacting part side, through which borehole, as mentioned, a corresponding connecting element can be pushed or is pushed in the properly mounted state of the energy storage arrangement.

The free end of a respective inserting portion can be closable or, in the properly mounted state of the energy storage arrangement, it can be closed by means of a cap component formed with a tool engagement area. A tool engagement area is typically understood to mean a borehole, generally an opening, in the cap element through which a tool, in particular a screwdriver, can be inserted. Therefore, the free end of a respective inserting portion is typically to be closed with a corresponding cap element only when a connecting element has been inserted into the inserting portion. The tool engagement area is intended to afford the possibility of placing a tool at a connecting element inserted into the inserting portion in order to fasten the connecting element at an energy storage unit or to fix it in place at an energy storage unit. The tool engagement area is typically to be dimensioned in such a way that it is not possible for an operator to engage it. The diameter of an appropriate tool engagement area accordingly is typically less than 10 mm, in particular less than 6 mm. Obviously, exceptions are conceivable in this connection.

An appropriate cap element can basically be fastened in a form-fitting and/or force-fitting and/or material-bonded manner at the inserting portion, in particular in the region of the free end of the inserting portion. The fastening of an appropriate cap element at the inserting portion can be detachable or undetachable. Coming into consideration as a form-fitting type of fastening is, for example, a locking engagement and, as a force-fitting type of fastening, a clamping or bracing and, as a material-bonded type of fastening, an adhesive bonding or welding, in particular an ultrasonic welding.

The invention further relates to a contacting element for an energy storage arrangement as described. The contacting element comprises a contacting part formed from an electrically conductive material and a touch protection part formed from an injection-moldable plastic material, wherein, for forming the touch protection part, the contacting part is overmolded at least on portions thereof with the injection-moldable plastic material forming the touch protection part. The contacting element is characterized in that, at the touch protection part, at least one positioning means for the correct positioning of the contacting element at the energy storage unit or at an energy storage housing is formed and/or at least one inserting means for the insertion of a connecting element that connects the connecting element to an energy storage unit or to an energy storage housing is formed.

Fundamentally, all embodiments in connection with the energy storage arrangement apply analogously to the contacting element.

A connecting element that can be inserted or is inserted into a respective inserting means is accordingly, in particular, a connecting screw formed from an electrically conductive material. A corresponding connecting screw can be provided at least on portions with an outer thread.

The contacting part can have two base portions, each of which has a contacting region for electrical contacting with an electrical terminal junction element on the energy storage unit side or on the energy storage housing side and a connecting portion that connects the two base portions.

An appropriate connecting portion can have first connecting portion segments that project from each base portion in an angled, in particular perpendicular, manner and a second connecting portion segment that connects each of the first connecting portion segments.

The positioning means or a positioning means can be formed by a seat that projects from the or a respective base portion of the contacting element in an angled, in particular perpendicular, manner for seating a positioning element that projects from the energy storage housing and is, in particular, dome-shaped, pin-like, or peg-like, or at least comprises such a positioning element and/or can be formed by a positioning element that projects from the or a respective base portion of the contacting element in an angled, in particular perpendicular, manner and is, in particular dome-shaped, pin-like, or peg-like, for seating in a seat formed at the energy storage housing, or at least comprises such a positioning element.

The inserting means, or an inserting means in general, can be formed by a sleeve-like inserting portion that projects from the or a base portion of the contacting element in an angled, in particular perpendicular, manner or at least comprises such an inserting portion.

The free end of each inserting portion is closable or can be closed via a cap component formed with a tool engagement area.

The cap element can be fastened in a form-fitting and/or force-fitting and/or material-bonded manner at the inserting portion, in particular in the region of the free end of the inserting portion.

Moreover, the invention relates to a method for producing or for assembling an energy storage arrangement as described. The method comprises the following steps:
  provision of at least two energy storage units, each of which comprises an energy storage housing with the energy storage cells arranged therein,
  arrangement of an electrical contacting element, which comprises a contacting part formed from an electrically conductive material and a touch protection part formed from an injection-moldable plastic material, wherein, for the formation of the touch protection part, the contacting part is overmolded at least on portions thereof with the injection-moldable plastic material forming the touch protection part, and wherein at least one positioning means is formed at the touch protection part for the correct positioning of the contacting element at an energy storage unit and/or at least one inserting means for inserting a connecting element that connects the contacting element with the energy storage unit is formed at the touch protection part at respective electrical terminal junction elements on the energy storage unit side or on the energy storage housing side, and
  electrical contacting of the at least two electric energy storage units by means of the connecting elements that connect the contacting element to an energy storage unit.

The provision of the at least two energy storage units, each of which comprises an energy storage housing with energy storage cells arranged in it, can also include a method step for the arrangement of respective energy storage cells in a corresponding energy storage housing. The energy storage cells in a corresponding energy storage housing can be pressed together or braced against one another.

The arrangement of an appropriate contacting element at respective electrical terminal junction elements on the energy storage unit side or on the energy storage housing side typically does not yet include any (adequate) electrical contacting of respective energy storage units and does not yet include any (adequate) fastening of the contacting element at the energy storage units.

Typically, the electrical contacting of the at least two energy storage units by means of the connecting elements that connect the contacting element to an energy storage housing brings about an (adequate) electrical contacting of respective energy storage units as well as an (adequate) fastening of the contacting element at the energy storage units or at the energy storage housings. Because appropriate connecting elements, as mentioned, are, in particular, connecting screws, the electrical contacting occurs typically by screwing in the connecting screws at the energy storage units, that is, by screwing in the connecting screws in the screw-connection regions formed at respective electrical terminal junction elements on the energy storage unit side or on the energy storage housing side.

In general, it is possible, through the introduction of appropriate connecting elements into respective inserting means and the closure of these inserting means via corresponding cap elements to create prefabricated contacting element assemblies, which, in the scope of the production and assembly of corresponding energy storage arrangements are to be arranged or fastened only at respective energy storage units or energy storage housings in order to create an electrical contacting of energy storage units. In this way, it is possible to improve the handling of corresponding electrical contacting elements as well as to ensure a reliable touch protection in connection with the production and assembly of corresponding energy storage arrangements.

Fundamentally, all embodiments in connection with the energy storage arrangement apply analogously to the method. Conversely, all embodiments in connection with the method apply analogously to the energy storage arrangement.

BRIEF DESCRIPTION OF THE DRAWINGS

Further advantages and details of the invention ensue from the exemplary embodiments described below as well as on the basis of the drawings. Shown are.

DETAILED DESCRIPTION OF THE DRAWINGS

Figure 1:
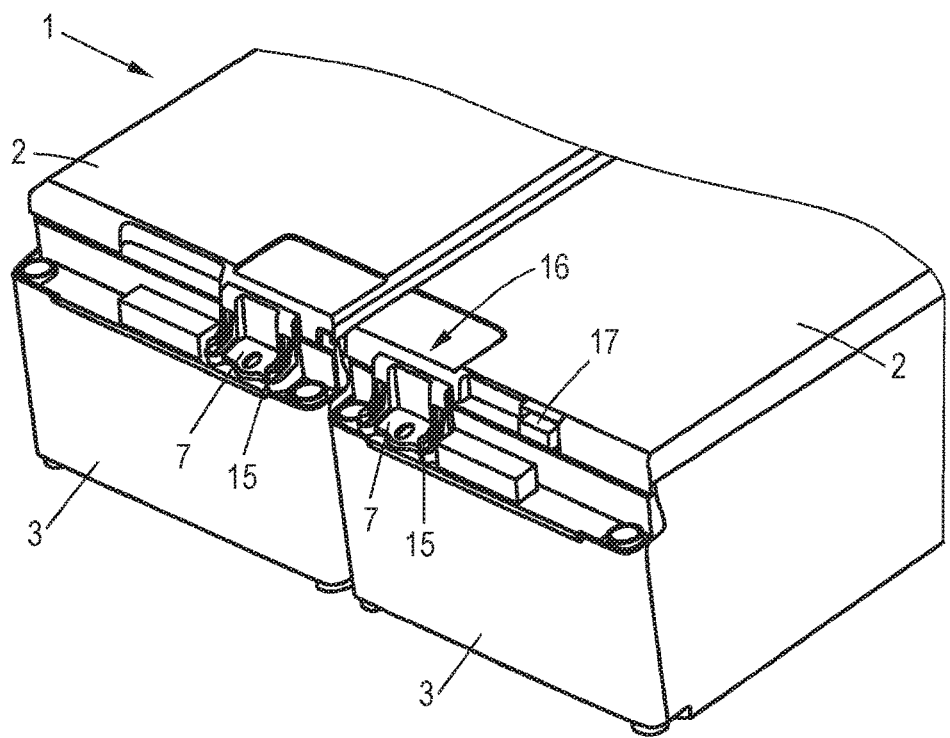
FIGS. 1, 2 in each case, an illustration of the principle of an energy storage arrangement in accordance with an exemplary embodiment.
Figure 2:
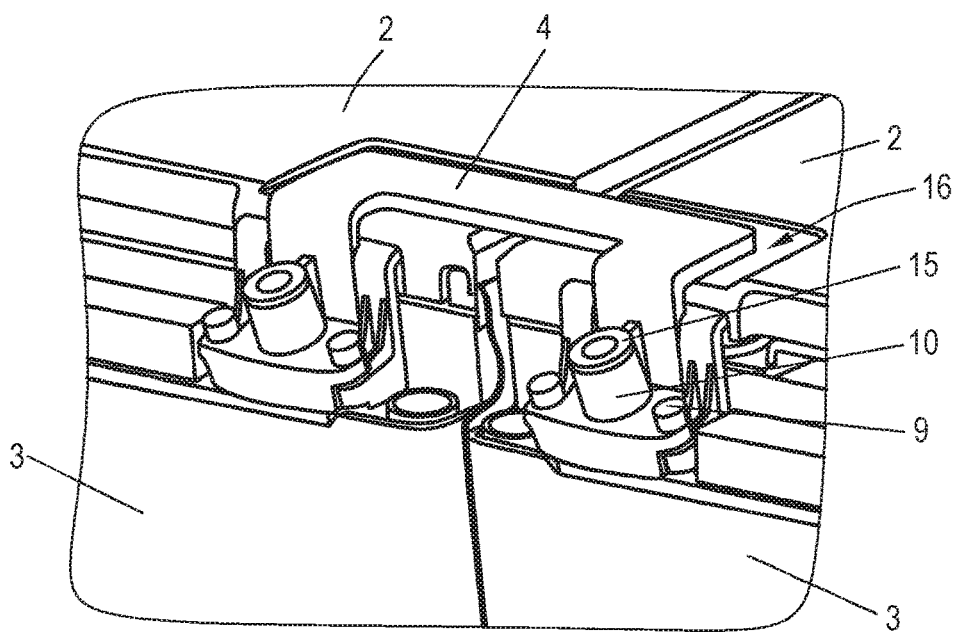

FIGS. 1, 2 each show an illustration of the principle of an excerpt from an energy storage arrangement 1 in accordance with an exemplary embodiment in a perspective view.

The energy storage arrangement 1 has a plurality of electric energy storage units 2. Even though, in the exemplary embodiments shown in the figure, only two energy storage units 2 are shown, the energy storage arrangement 1 can obviously have more than two corresponding energy storage units 2. The energy storage units 2 each comprise a frame-like energy storage housing 3 with electric energy storage cells (not shown) arranged therein. The energy storage cells can be, for example, lithium-ion cells.

As can be seen, in particular on the basis of FIG. 2, which shows the properly mounted state of the energy storage arrangement 1, the energy storage units 2 are electrically contacted with one another by means of an electrical contacting element 4. The contacting element 4, shown separately in FIGS. 3-6, comprises a contacting part 5 and a touch protection part 6 that is connected undetachably to it by overmolding.

The contacting part 5 serves for the actual electrical contacting of the contacting element 4 with the energy storage units 2, that is, with respective electrical terminal junction elements 7 (compare FIG. 1) on the energy storage unit side or on the energy storage housing side. The contacting part 5 is appropriately formed from an electrically conductive material, namely a metal, such as, for example, aluminum.

The touch protection part 6 serves for the creation of an (electrical) touch protection, which prevents any transmission of electric energy from a respective energy storage unit 2 to an operator, such as, for example, a worker, or to an object, such as, for example, a terminal junction component or a robot, via the contacting element 4. Accordingly, no "outward" electric energy is applied to the contacting element, that is, in particular no electric voltage. The touch protection part 6 is accordingly formed from an electrically non-conductive or very poorly conductive material, namely an injection-moldable material, that is, a plastic material that can be processed in a plastic injection-molding process, such as, for example, PA, PC, PE, PP, PBT, etc.

For formation of the touch protection part 6, the contacting part 5 is overmolded on portions with the injection-moldable material forming the touch protection part 6. The production of the touch protection part 6 and hence of the entire contacting element 4 therefore occurs by overmolding portions of the contacting part 5 with the injection-moldable plastic material forming the touch protection part 6 in the scope of a plastic injection-molding process, that is, in particular in the scope of a so-called insert molding process. As can be seen, in particular on the basis of FIG. 4, which shows a bottom side of the contacting element 4, the contacting part 5, apart from the contacting regions 12 on the contacting part side for contacting of the contacting element 4 with corresponding electrical terminal junction elements 7 on the energy storage unit side or on the energy storage housing side is overmolded completely with the plastic material forming the touch protection part 6.

Figure 3:
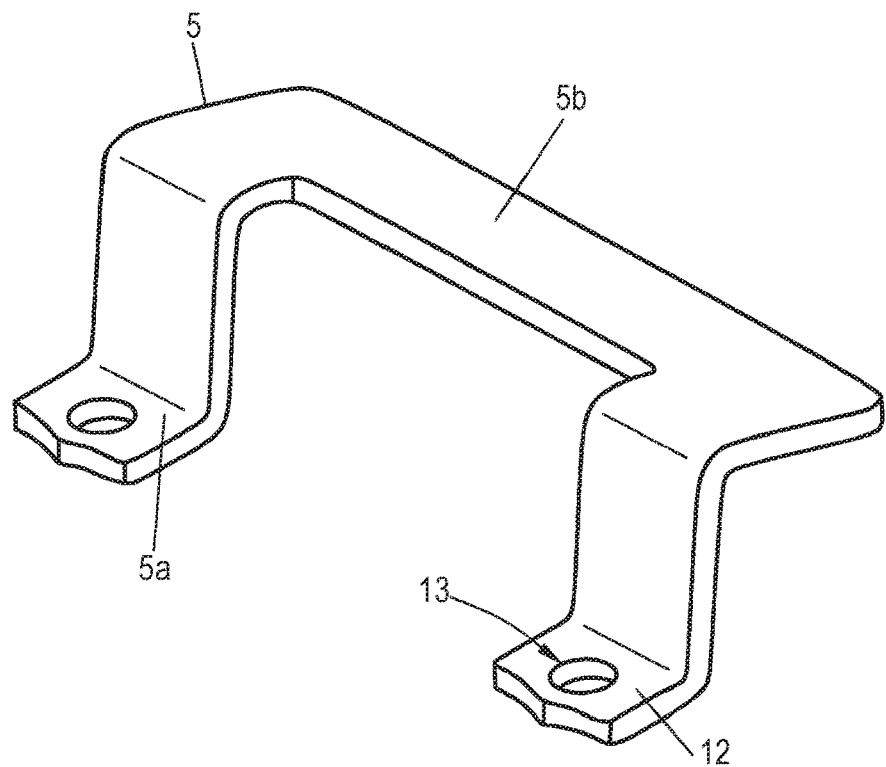
FIGS. 3-6 in each case, an illustration of the principle of a contacting element in accordance with an exemplary embodiment.

On the basis of FIG. 3, which shows a contacting part 5 prior to the overmolding with the plastic material forming the touch protection part 6, it can be seen that the contacting part 5 has two base portions 5a, each of which has a respective contacting region 12 for electrical contacting of the contacting element 4 with an electrical terminal junction element 7 on the energy storage unit side or on the energy storage housing side, and a connecting portion 5b that connects the two base portions 5a. The base portions 5a serve functionally, via corresponding contacting regions 5b, for producing an electrical contacting of the contacting element 4 with an energy storage unit 2, that is, with an electrical terminal junction element 7 on the energy storage unit side or on the energy storage housing side. The base portions 5a are each provided with a borehole 13, through which a connecting element 11, which will be discussed in detail below, can be inserted or is inserted in the properly mounted state of the energy storage arrangement 1.

It can be seen that the connecting portion 5b has first connecting portion segments, which are not further indicated and project in an angled, in particular perpendicular, manner from a respective base portion 5a, and a second connecting portion segment, which is not further indicated and connects the respective first connecting portion segments. The thereby resulting, overall angled geometric design of the contacting part 5 is created by stamping/bending processes; the contacting part 5 is accordingly a stamped/bent part that is relatively easy to create in terms of production engineering.

Figure 4:
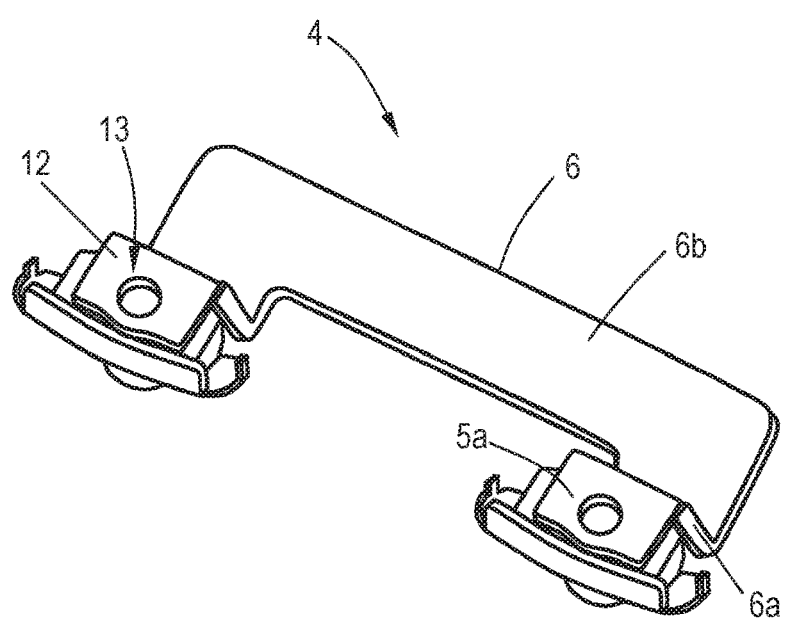
Figure 5:
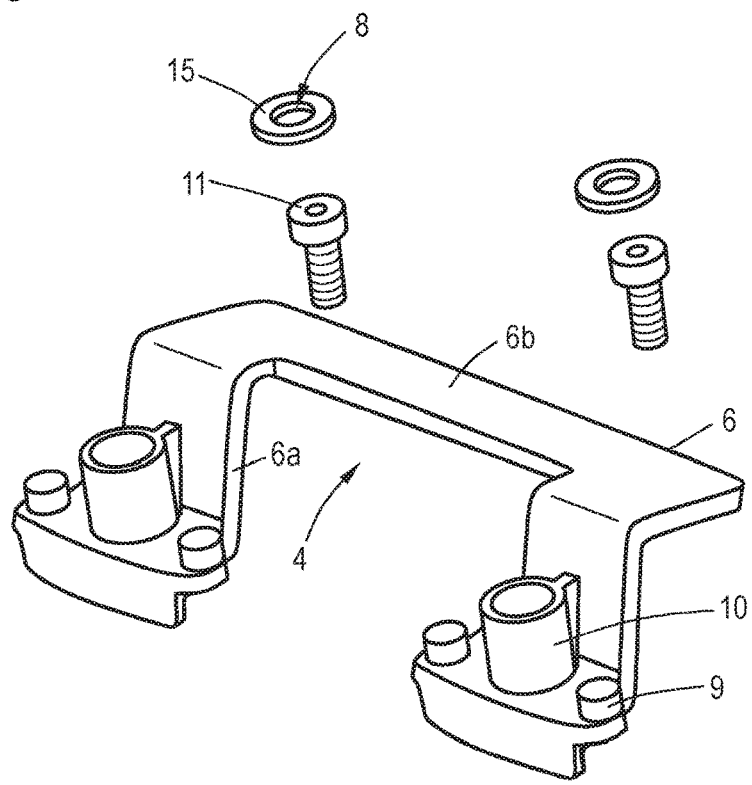
Figure 6:
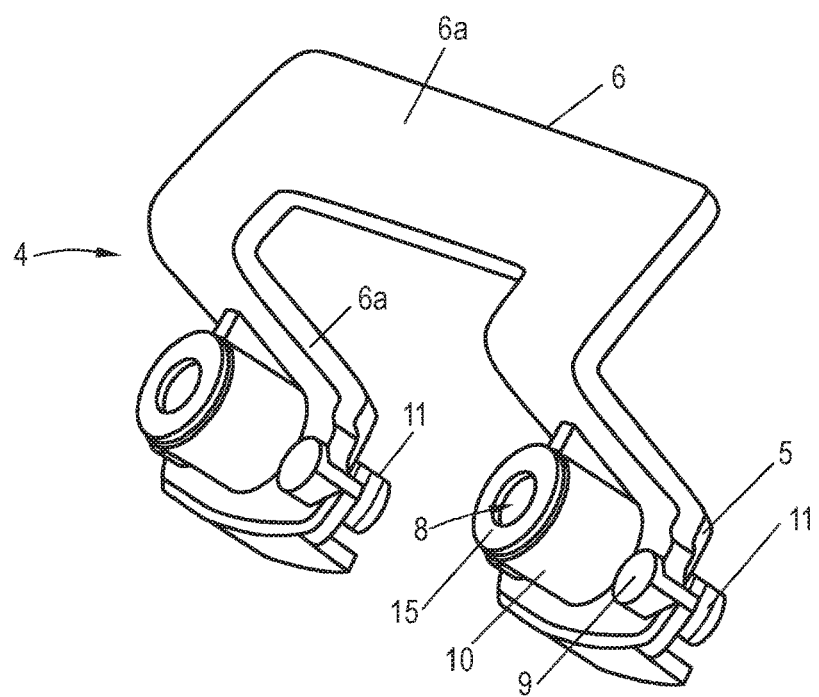

As can be seen, in particular on the basis of FIG. 4-6, the geometric design of the touch protection part 6 follows the geometric design of the contacting part 5. Correspondingly, the touch protection part 6 likewise has a base portion 6a and a connecting portion 6b that connects the two base portions 6a. The connecting portion 6b likewise has first connecting portion segments, which are not further indicated and project in an angled, in particular perpendicular, manner from a respective base portion 6a, and a second connecting portion segment, which is not further indicated and connects the respective first connecting portion segments.

As can be seen, in particular on the basis of FIGS. 5, 6, functional elements equally specified in the scope of the contacting part 5 and in the scope of creation of the touch protection part 6 are formed at the touch protection part 6. The functional elements are accordingly formed or molded in one piece or integrally with the touch protection part 6 at the touch protection part 6. The functional elements are appropriate in regard to the handling of each electric energy storage unit 2 and each of the contacting elements 4 as well as in regard to ensuring a reliable touch protection in connection with the production and assembly of the energy storage arrangement 1.

In a first type of a corresponding functional element formed at the touch protection part 6, what is involved is a positioning means 9 or a positioning aid for the correct positioning of the contacting element 4 at an energy storage unit 2 or at an energy storage housing 3. The correct positioning of the contacting element 4 at an energy storage unit 2 or at an energy storage housing 3 is simplified via corresponding positioning means 9.

An appropriate positioning means 9 is formed, in the exemplary embodiments shown in the figure, by a seat that projects from a corresponding base portion 6a of the touch protection part 6, generally of the contacting element 4, in a perpendicular manner for seating a dome-like positioning element 15 (compare FIG. 1) projecting from the energy storage housing 7.

A second type of appropriate functional element formed at the touch protection part 6 is an inserting means 10 for the insertion of a connecting element 11 that connects the contacting element 4 to an energy storage unit 2 or to an energy storage housing 3. The insertion of a corresponding connecting element 11 that connects the contacting element 4 to an energy storage unit 2 or to an energy storage housing 3 is simplified via the corresponding inserting means 10.

An appropriate inserting means 10 is formed, in the exemplary embodiments shown in the figure, by an inserting portion that projects from a corresponding base portion 6a of the touch protection part, generally of the contacting element 4, in a perpendicular manner and has the shape of a sleeve or tube or, in general, a hollow cylinder. The inner diameter of a corresponding sleeve-like inserting portion is adapted to the maximum outer diameter of a respective connecting element 11, so that it can be introduced into the inserting portion, in a straightforward manner. An appropriate sleeve-like inserting portion, as viewed axially, passes into the borehole 13 present in a base portion 5a on the contacting part side, through which, as mentioned, a corresponding connecting element 11 can be inserted or, in the properly mounted state of the energy storage arrangement, is inserted (compare, for example, FIG. 7).

As ensues, in particular, from FIG. 5, which shows an exploded view of the contacting element 4 along with functionally associated components, what is involved in the case of an appropriate connecting element 11 is a connecting screw formed from an electrically conductive material, namely a metal. It can be seen on the basis of FIG. 7 that the connecting screw can be screwed into a screw-connection region 14 formed at an electrical terminal junction element 7 on the energy storage unit side or on the energy storage housing side or is screwed in place in the properly mounted state of the energy storage arrangement 1. An appropriate connecting screw can be provided at least on portions thereof with an outer thread and a respective screw-connection region 14 can be provided at least on portions thereof with an inner thread corresponding to the outer thread of the connecting screw.

Figure 7:
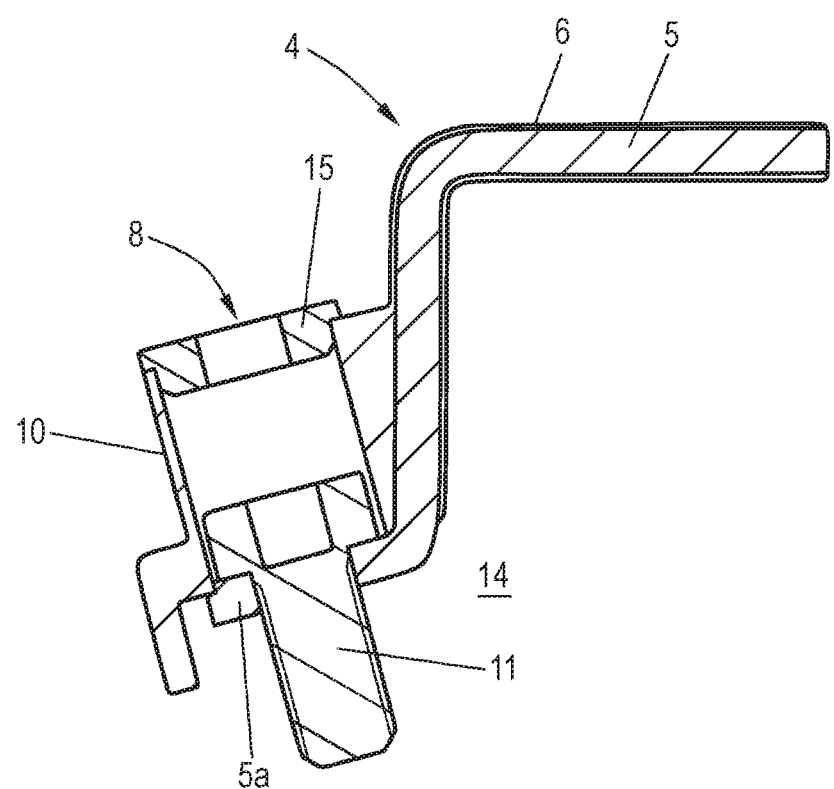
FIG. 7 a sectional illustration through an energy storage arrangement in accordance with an exemplary embodiment.

In particular, it can be seen on the basis of FIGS. 5, 6, and 7 that the free end of an appropriate inserting portion can be closed or, in the properly mounted state of the energy storage arrangement, is closed via a cap element 15 formed with a tool engagement area 8 (compare FIGS. 6, 7). A tool engagement area 8 is understood in the exemplary embodiments shown in the figures to be a borehole, in general an opening, in the cap element 15, through which a tool, in particular a screwdriver, can be inserted. Therefore, the free end of an appropriate inserting portion is to be closed with a corresponding cap element 15 only when a connecting element 11 has been introduced into the inserting portion.

The tool engagement area 8 is intended to afford the possibility of placing a tool at a connecting element 11 introduced into the inserting portion in order to fasten or fix in place the connecting element 11 at an energy storage unit 2 or at an energy storage housing 3. The tool engagement area 8 is typically dimensioned such that it is not possible for an operator to engage it. The diameter of an appropriate tool engagement area accordingly is typically less than 10 mm, in particular less than 6 mm.

An appropriate cap element 15 can basically be fastened in a form-fitting and/or force-fitting and/or material-bonded manner at the inserting portion, in particular in the region of the free end of the inserting portion. An appropriate cap element 15 is fastened at the inserting portion in the exemplary embodiments shown in the figures in a material-bonded manner by means of welding, that is, by means of ultrasonic welding.

In addition, it also needs to be mentioned in regard to FIGS. 1, 2 that contoured recesses 16 can be provided on the energy storage housing side corresponding to the contacting element 4, that is, in particular corresponding to the connecting portions 5b, 6b associated therewith, in which recesses the contacting element 4, together with its associated connecting portions 5b, 6b, can be seated flush with the other top side of a corresponding energy storage housing 3.

Fundamentally, it is to be noted that the dimensions and shape, in general the geometric design, of the contacting element 4 are adapted to the respective energy storage unit 2. The contacting element 4 can accordingly be scaled as needed in regard to its dimensions and shape or, in general, its geometric design.

Beyond this, the dimensions of each of the contacting elements 4 can be chosen in such a way that low-voltage terminal junction elements 17 on the energy storage unit side, as shown in FIG. 1 by way of example, can be accessed freely, so that a connection of each electric consumption device, that is, in particular, of a device for controlling or monitoring the operation of the energy storage arrangement 1 or of the energy storage unit 2 can be designed without any problem.

A method for producing or for assembling an energy storage arrangement 1 shown in the exemplary embodiments in the figure comprises the following steps:

provision of a plurality of energy storage units 2, each of which comprises an energy storage housing 3 with the energy storage cells arranged therein, arrangement of an electrical contacting element 4, which comprises a contacting part 5 formed from an electrically conductive material and a touch protection part 6 formed from an injection-moldable plastic material, wherein, for the creation of the touch protection part 6, the contacting part 5 is overmolded at least on portions thereof with the injection-moldable plastic material forming the touch protection part 6, and wherein at least one positioning means 9 is formed at the touch protection part 6 for the correct positioning of the contacting element 4 to an energy storage unit 2 and/or at least one inserting means 10 for inserting a connecting element 11 that connects the contacting element 4 with the energy storage unit 2 is formed at the touch protection part 6 at respective electrical terminal junction elements 7 on the energy storage unit side or on the energy storage housing side, and electrical contacting of the electric energy storage units 2 by means of the connecting elements 11 that connect the contacting element 4 to an energy storage unit 2.

The provision of the energy storage units 2 can also include a method step for the arrangement of respective energy storage cells in a corresponding energy storage housing 3. The energy storage cells in a corresponding energy storage housing 3 can be pressed together or braced against one another.

The arrangement of an appropriate contacting element 4 at respective electrical terminal junction elements 7 on the energy storage unit side or on the energy storage housing side typically does not yet include any (adequate) electrical contacting of the respective energy storage units 2 and does not yet include any (adequate) fastening of the contacting element 4 at the energy storage units 2.

Typically, the electrical contacting of the energy storage units 2 by means of the connecting elements 11 that connect the contacting element 4 to an energy storage unit 2 brings about an (adequate) electrical contacting of respective energy storage units 2 as well as an (adequate) fastening of the contacting element at the energy storage units 2 or at the energy storage housings 3. Because appropriate connecting elements 11, as mentioned, are, in particular, connecting screws, the electrical contacting occurs typically by screwing in the connecting screws at the energy storage units 2, that is, by screwing in the connecting screws in corresponding screw-connection regions 14 formed on the energy storage unit side or on the energy storage housing side.

In general, it is possible, through the insertion of appropriate connecting elements 11 into respective inserting means 10 and the closure of these inserting means via corresponding cap elements 15 to create prefabricated contacting element assemblies, which, in the scope of the production and assembly of corresponding energy storage arrangements 1 are to be arranged or fastened only at corresponding energy storage units 2 or energy storage housings 3 in order to create an electrical contacting of energy storage units 2. In this way, it is possible to improve the handling of corresponding electrical contacting elements 4 as well as to ensure a reliable touch protection in connection with the production and assembly of corresponding energy storage arrangements 1.

The invention claimed is:

1. An energy storage arrangement, comprising:
at least two electric energy storage units, each of which includes an energy storage housing with electric energy storage cells arranged therein, wherein the at least two electric energy storage units are electrically contacted by an electrical contacting element, wherein the electrical contacting element includes a contacting part formed from an electrically conductive material and a touch protection part formed from an injection-moldable plastic material, wherein, for forming the touch protection part, the contacting part is overmolded at least on portions thereof with the injection-moldable plastic material forming the touch protection part,
wherein for correcting a position of the contacting element at an energy storage unit, at least one positioner is formed at the touch protection part and for the insertion of a connecting element that connects the contacting element to the energy storage unit, at least one insert is formed at the touch protection part, and
wherein the contacting part has two base portions, each of which has a contacting region for electrical contacting with an electrical terminal junction element on the energy storage unit side and a connecting portion that connects the two base portions.

2. The energy storage arrangement according to claim 1, wherein the connecting portion has first connecting portion segments projecting from a respective base portion in an angled manner and a second connecting portion segment that connects the respective first connection portion segments.

3. The energy storage arrangement according to claim 1, wherein the at least one positioner is formed by a seat that projects from the base portion of the contacting element in an angled, manner for seating a positioning element that projects from the energy storage housing and is dome-shaped or pin-like, or includes a positioning device, and wherein the at least one positioner is formed by a positioning element that projects from the base portion of the contacting element in an angled manner for seating in a seat that is formed at the energy storage housing and is dome-shaped, pin-like, or peg-like.

4. The energy storage arrangement according to claim 1, wherein at least one insert is formed by a sleeve-like inserting element projecting from the or a base portion of the contacting element in an angled manner.

5. The energy storage arrangement according to claim 4, wherein a free end of each inserting portion can be closed or is closed via a cap element formed with a tool engagement area.

6. The energy storage arrangement according to claim 5, wherein the cap element is fastened at the inserting portion, in a form-fitting, force-fitting, material-bonded manner.

7. The energy storage arrangement according to claim 1, wherein a connecting element that is inserted into a corresponding insert is a connecting screw that is formed from an electrically conductive material and can be screwed into or is screwed into a screw-connection region on the energy storage unit side.

8. A contacting element for an energy storage arrangement, comprising:
a contacting element, including a contacting part formed from an electrically conductive material, and a touch protection part formed from an injection-moldable plastic material, wherein, for forming the touch protection part, the contacting part is overmolded at least on portions thereof with the injection-moldable plastic material forming the touch protection part, wherein at least one positioner for correcting a position of the contacting element at a positioning element arranged or formed on the energy storage unit side for this purpose is formed at the touch protection part and wherein at least one insert for the insertion of a connecting element that connects the contacting element to an energy storage unit is formed at the touch protection part, and
wherein the contacting part has two base portions, each of which has a contacting region for electrical contacting with an electrical terminal junction element on the energy storage unit side and a connecting portion that connects the two base portions.

9. The contacting element according to claim 8, wherein the connecting portion has first connecting portion segments projecting from a respective base portion in an angled, manner and a second connecting portion segment that connects the respective first connection portion segments.

10. The contacting element according to claim 9, wherein at least one positioner is formed by a seat that projects from at least one of the base portions of the contacting element in an angled manner for seating a positioning element that projects from the energy storage housing and is dome-shaped, pin-like, or peg-like, or includes a positioning element, and wherein the at least one positioning element is formed by a positioning element that projects from the corresponding base portion of the contacting element in an angled manner for seating in a seat that is formed at the energy storage housing and is dome-shaped, pin-like, or peg-like, or includes such a positioning element.

11. The contacting element according to claim 8, wherein the at least one inserting element is formed by a sleeve-like inserting element projecting from the base portion of the contacting element in an angled manner.

12. The contacting element according to claim 11, wherein a free end of each inserting portion can be closed or is closed via a cap element formed with a tool engagement area.

13. The contacting element according to claim 12, wherein the cap element is fastened at the inserting portion, in a form-fitting, force-fitting, or material-bonded manner.

14. The contacting element according to claim 8, wherein a connecting element that is inserted into a corresponding insert is a connecting screw that is formed from an electrically conductive material.

* * * * *